Figure 8:
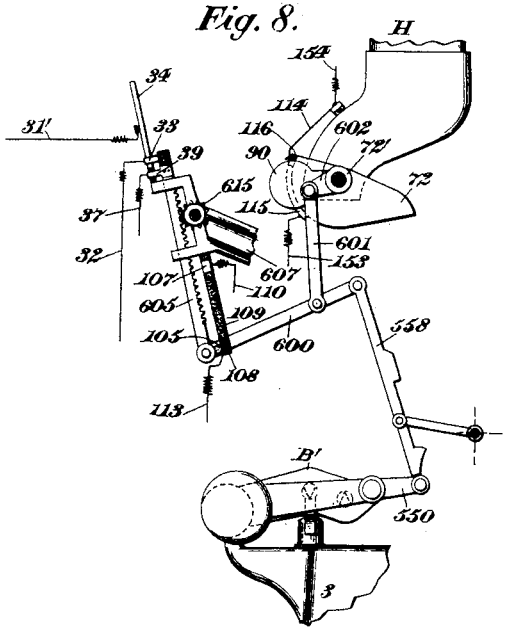

No. 607,473. Patented July 19, 1898.
F. H. RICHARDS.
RECORDING APPARATUS FOR WEIGHING MACHINES.
(Application filed Apr. 16, 1897.)
(No Model.) 7 Sheets—Sheet I.

Witnesses
Inventor
F. H. Richards.

No. 607,473. Patented July 19, 1898.
F. H. RICHARDS.
RECORDING APPARATUS FOR WEIGHING MACHINES.
(Application filed Apr. 16, 1897.)
(No Model.) 7 Sheets—Sheet 2.

Witnesses
Inventor
F. H. Richards

No. 607,473. Patented July 19, 1898.
F. H. RICHARDS.
RECORDING APPARATUS FOR WEIGHING MACHINES.
(Application filed Apr. 16, 1897.)
(No Model.)
7 Sheets—Sheet 4.

Witnesses

Inventor

No. 607,473. Patented July 19, 1898.
F. H. RICHARDS.
RECORDING APPARATUS FOR WEIGHING MACHINES.
(Application filed Apr. 16, 1897.)
(No Model.) 7 Sheets—Sheet 5.

Witnesses
Chas. F. Schmelz
E. Sausapied

Inventor
F. H. Richards.

No. 607,473. Patented July 19, 1898.
F. H. RICHARDS.
RECORDING APPARATUS FOR WEIGHING MACHINES.
(Application filed Apr. 16, 1897.)

(No Model.) 7 Sheets—Sheet 6.

Witnesses
Inventor

No. 607,473. Patented July 19, 1898.
F. H. RICHARDS.
RECORDING APPARATUS FOR WEIGHING MACHINES.
(Application filed Apr. 16, 1897.)
(No Model.) 7 Sheets—Sheet 7.

Witnesses: Inventor:
F. H. Richards.

THE NORRIS PETERS CO., PHOTO-LITHO., WASHINGTON, D. C.

UNITED STATES PATENT OFFICE.

FRANCIS H. RICHARDS, OF HARTFORD, CONNECTICUT.

RECORDING APPARATUS FOR WEIGHING-MACHINES.

SPECIFICATION forming part of Letters Patent No. 607,473, dated July 19, 1898.

Application filed April 16, 1897. Serial No. 632,380. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Recording Apparatus for Weighing-Machines, of which the following is a specification.

This invention relates to an electric registering apparatus, and especially to means for registering the operation of an automatic weighing-machine, the main object of the invention being to provide an apparatus by means of which the number of loads made up and discharged by a weighing-machine may be registered and the operation of the principal elements of the machine indicated.

Weighing-machines as ordinarily constructed are adapted to weigh predetermined quantities of material, and the load is generally supplied to a load-receiver and controlled by valve mechanism, by means of which the flow of material is shut off after the aforesaid predetermined quantity has been delivered to the load-receiver. The discharge of a completed load is usually controlled by a shiftable load-discharger which may be either an "oscillatory" or "tipping" load-receiver or a closer properly supported for normally sealing a discharge-opening in such receiver. As the accuracy of the weighing operation depends almost entirely upon the proper operation and coöperation of the stream-controlling means or valve mechanism and the shiftable load-discharger, it will be apparent that any registering apparatus which has for its object the indication of the manner in which the weighing-machine is operating should indicate the action of such stream-controlling means and load-discharger. This is especially true for the reason that the operations of the valve mechanism and the load-discharger are usually reciprocal, the valve or valves controlling the supply of material being normally open when the load-discharger is in its normal position for permitting the making up of a load and the valve or valves being shut when the load-discharger is shifted on the completion of a full load in the receiver. For these reasons the registration of the movements of the stream-controlling means and the load-discharger of the weighing-machine constitutes an essential feature of the operation of the registering apparatus and forms the most important means for indicating at all times whether the principal elements of the weighing-machine are operating in accordance with that proper predetermined and necessary sequence of movements which is characteristic of the action of a perfectly-organized mechanism of this type.

Although the indication of the movements of the valve mechanism and the load-discharger is the principal feature of the operation of registering the action of the weighing-machine, I deem it desirable and advantageous to also indicate the working of other parts of the machine and especially to register electrically the number of loads delivered by the machine and to keep tally at the point (usually remote from the weighing apparatus) at which the operation of the other parts of the machine is indicated. Moreover, as it is customary to deliver material to the valve mechanism of a weighing-machine from a hopper controlled by a valve or gate independent of such machine I prefer to indicate also the movements of this main gate by means of the registering apparatus.

In order to make a permanent record of the action of the several parts of the weighing-machine hereinbefore referred to, I make use of a registering apparatus embodying means for recording on a moving strip or tape the action of these parts, and I also employ such strip for the purpose of recording or imprinting thereon the number of loads weighed by the machine, the recording devices being so disposed and organized as to coöperate and form on the moving tape an exact and permanent record of the weighing of each load and the manner in which the essential elements of the machine were operating during the weighing, these records being made at corresponding points in the movement of the tape.

It will be obvious that the tape on which this record is made should be advanced at a uniform rate of speed in order that any variation in the rate at which material is supplied to the load-receiver may be observed and any irregularity in the operation of the parts may be noted. For the purpose of comparing these variations and irregularities I deem it advantageous to record on the moving tape time indications at regular intervals, the preferred interval being that which will indicate the normal length of time required for a complete cycle of operation of the various parts of the weighing-machine. As all these records should of course be made at corresponding points in the length of the tape, it will be clear that the several devices by means of which these records are made should operate at different points in the width of the moving strip.

In recording the operation of the stream-controlling means, the load-discharger, &c., I may make use of vibratory choppers having knife-edges adapted to form parallel cuts, while the time indications on the tape may be formed by perforating the latter at regular intervals with round holes to distinguish these indications from the records for the valve mechanism and the load-discharger. It will be obvious, of course, that the record of the number of loads weighed should be made by imprinting or embossing with Arabic numerals in the usual manner.

One of the principal uses of weighing-machines is for delivering a determined weighed quantity of grain or other material from an elevator or dock to a car or vessel, means being provided for automatically stopping the operation of the machine after the determined number of loads have been delivered.

As it is my intention to control the stopping of the operation of the machine by means of a stop-register located not on the weighing-machine itself, but at a distance therefrom—in an office, for instance, disconnected from the main building in which the weighing-machine is placed—it will be evident that this register may form a part of the registering apparatus and should be operated electrically and not mechanically from the weighing-machine. Hence the means for stopping the operation of the weighing mechanism should also be electrically operated and controlled from the stop-register in such a manner that after the determined quantity of material for which the stop-register may have been set shall have been weighed out the machine will be thrown out of action and further operation thereof prevented until the register shall have been reset.

In my prior application, filed March 22, 1897, Serial No. 628,616, I have shown one form of stopping device suitable for throwing out of action a weighing-machine of the general type illustrated in this case and in prior patents granted to me, and with suitable modifications, rendered necessary for the purpose of adapting it to the requirements of the system shown herein, the stopping mechanism employed in the apparatus shown in this application is of the same general type. It embodies as its essential feature means for throwing a valve-opening actuator out of operative relation with the valve which it is intended to actuate, this throwing-out means being controlled electrically by the setting and the automatic release of the stop member of the stop-register.

All of the registering mechanism and most of the controlling devices, by means of which the starting and the stopping of the weighing-machine, the opening and the closing of the main gate of the supply-chute, and the movements of the several registering devices are governed, will usually be located in the office, preferably in a suitable casing especially constructed to inclose the same and prevent tampering with the apparatus, and by means of this apparatus an attendant in the office will be enabled to start and stop the operation of the weighing-machine, open and close the main gate in the supply-chute, observe the action of the machine, and especially variations and irregularities in the operations of the several parts, and locate and correct any fault in the operation of the registering mechanism or the weighing-machine.

As the operations of the valve mechanism and the load-discharger are normally reciprocal, the records made on the moving tape by the recording devices controlled therefrom will also be normally reciprocal, and hence when the machine is operating properly the record for each complete cycle of operation of the weighing mechanism will embody a series of parallel cuts showing the operation of the valve mechanism and a succeeding series of similar cuts at one side of the first series to indicate the operation of the load-discharger.

In the system which I have illustrated herein there are embodied a stop-register for indicating the number of loads weighed by the machine during one continuous operation of the latter, a register or counter for indicating the entire number of loads weighed during several disconnected periods of operation of the machine, recording devices for recording the action of the valve mechanism, the beam mechanism, and the load-discharger, and a numbering device for embossing or imprinting on the tape the number of loads weighed.

It will be obvious that the two registers or counters, the numbering device, and the recording device or chopper for the load-discharger may be electrically operated from such load-discharger of the weighing-machine, and hence all of these parts should be included in the same circuit and preferably in parallel therein. This parallel connection of the parts in the circuit from the load-discharger enables a rapid chopping action of the chopper for the load-discharger to be secured and also permits the employment of a numbering device which will record a series of weighed loads, not consecutively, but successive groups of such series collectively, this result being attained in the present case by the use of an automatic step-by-step circuit-maker which will close the circuit of the numbering device, not on each closure of such circuit by the load-discharger, but after a series of such closures.

The main gate for opening and closing the supply-spout and the stopping device for throwing the machine into and out of action should be controlled from the registering apparatus, they being operated, preferably, by means of electric motors in separate branches of a power-circuit governed by suitable circuit-controlling means in the register-casing, the motor for the stopping device being preferably started and stopped by the automatic making and breaking of the circuit thereto.

Figure 1:
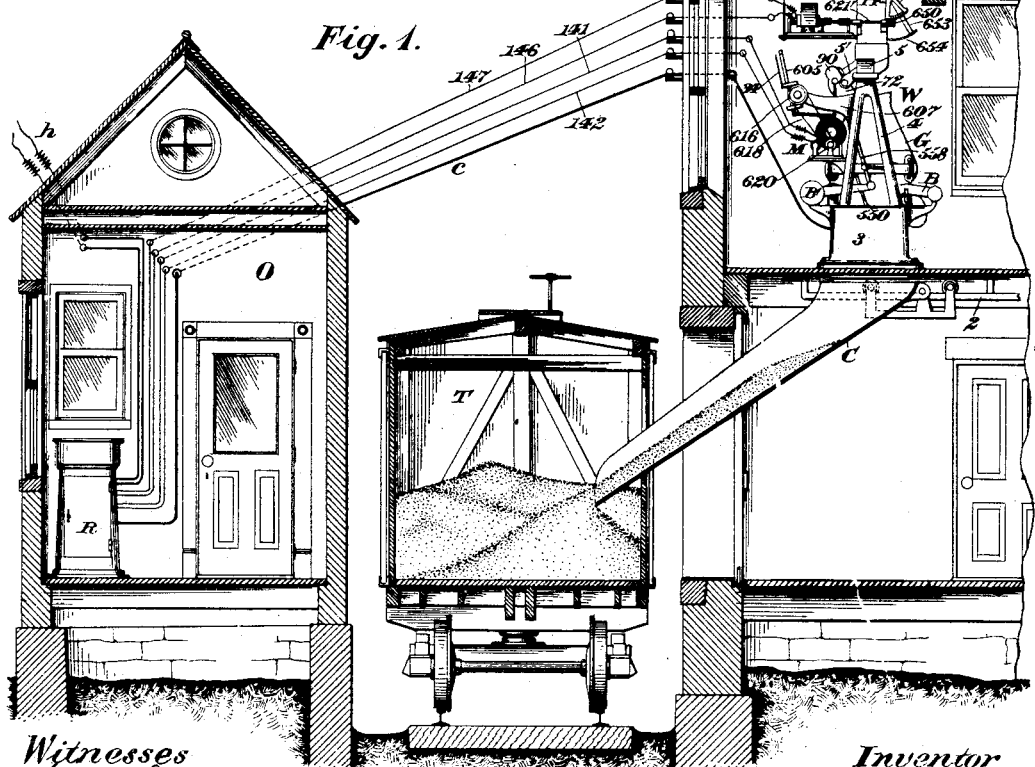
Figure 2:
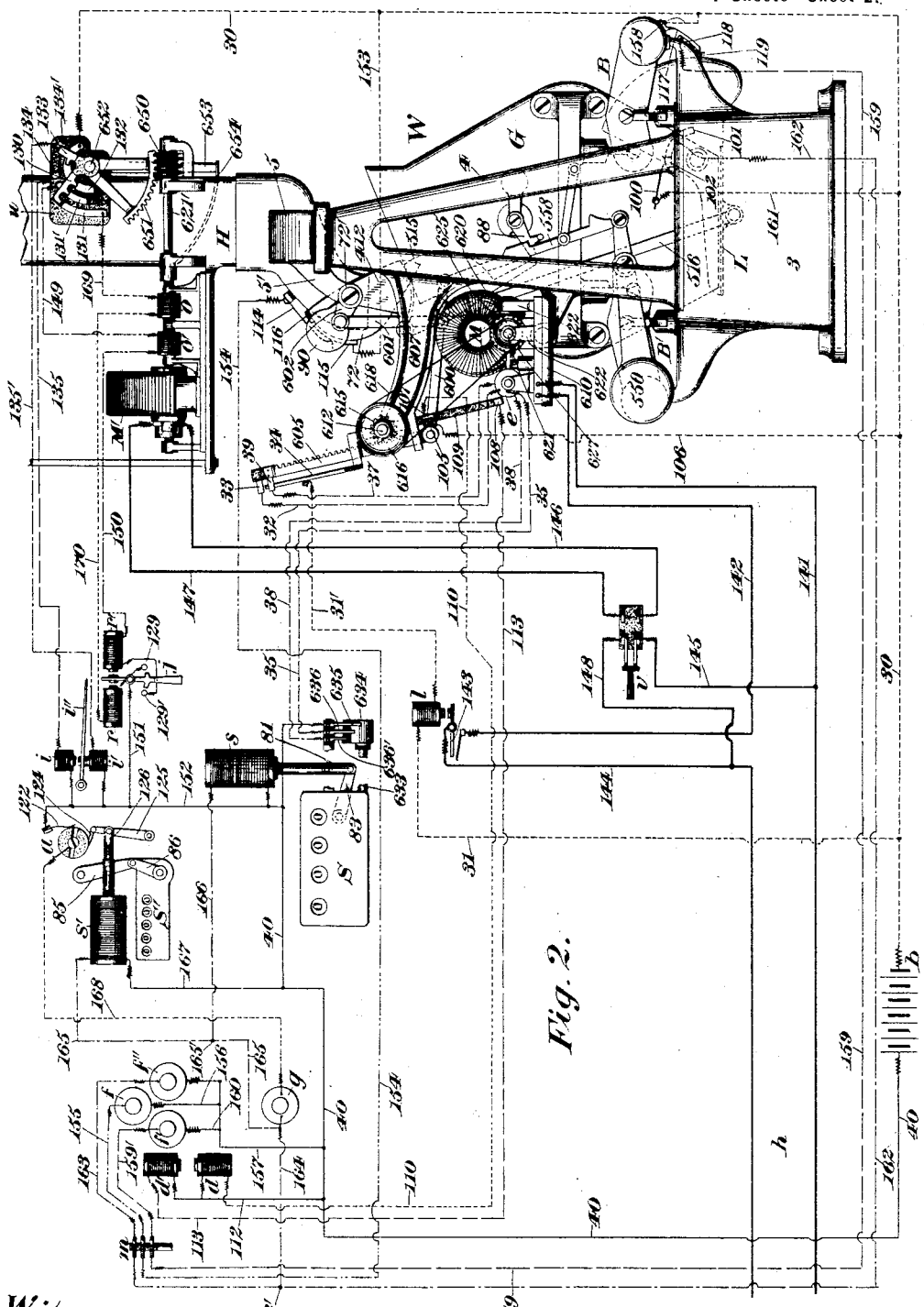
Figures 3, 4:
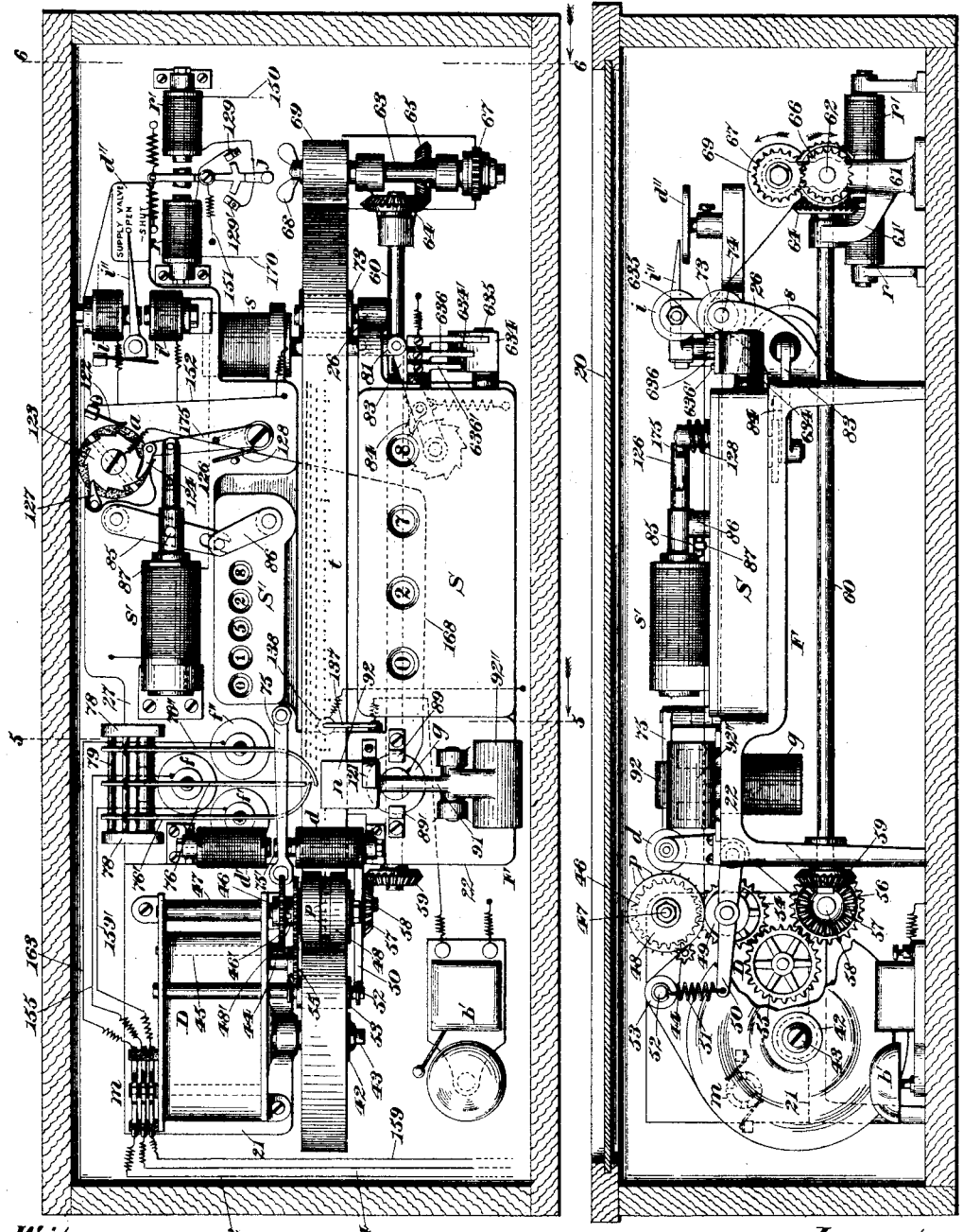
Figure 5:
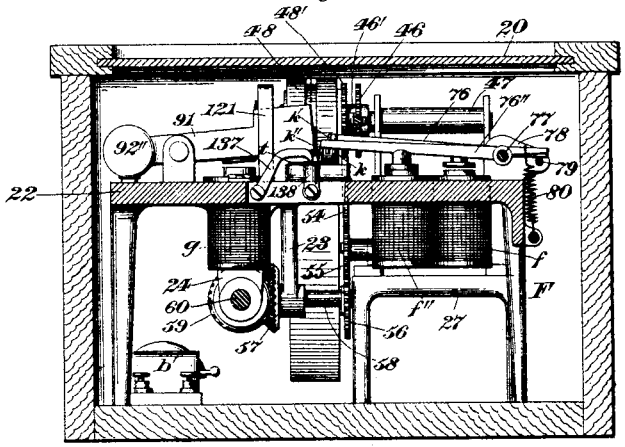
Figure 6:
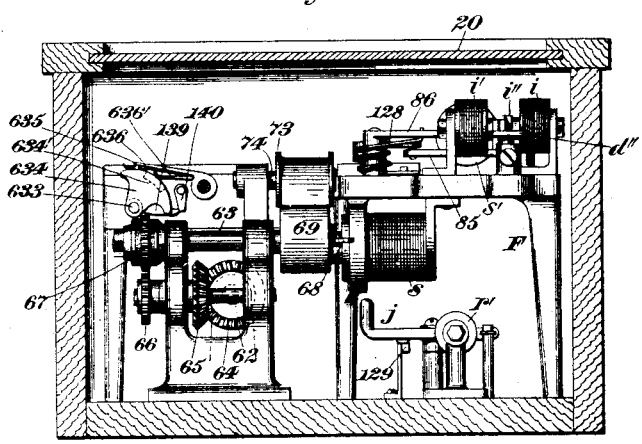
Figure 7:
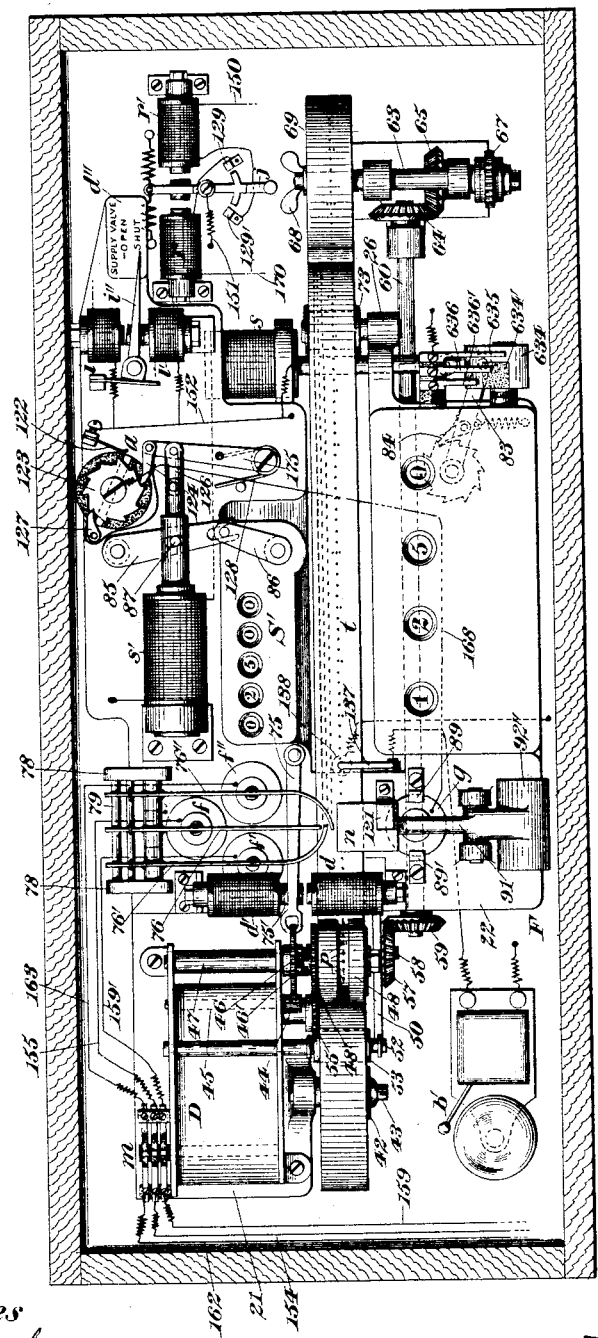
Figure 9:
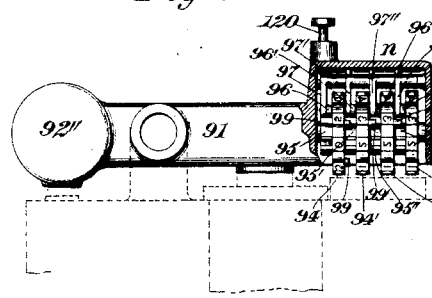
Figure 10:
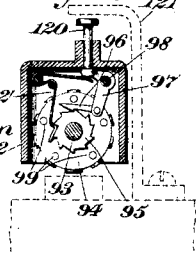
Figure 11:
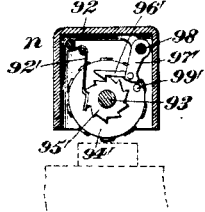
Figure 12:
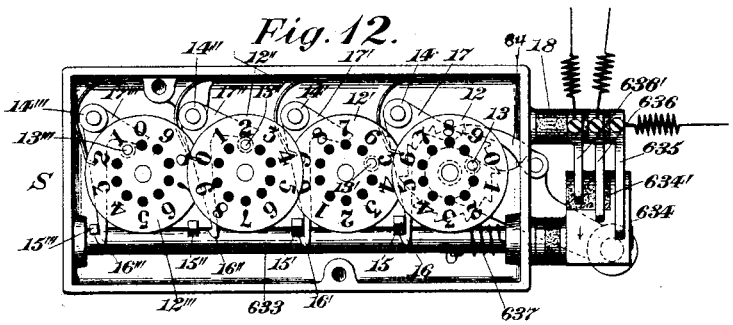
Figure 13:
Figure 14:
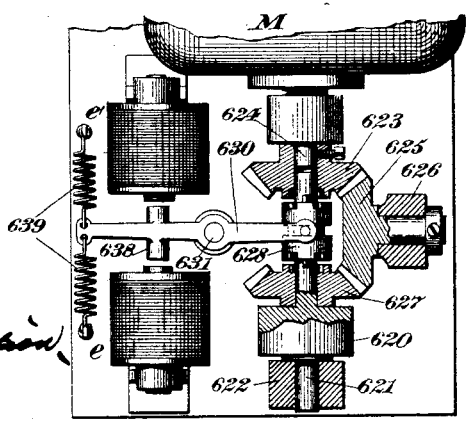

In the drawings accompanying and forming part of this specification, Figure 1 is a general sectional view illustrating the manner in which grain or other material may be automatically transferred in determined weighed quantities from a grain-elevator to a car by a weighing-machine controlled from an office disconnected from the main building, such office having therein the registering apparatus for indicating the action of the weighing-machine. Fig. 2 is a diagrammatic view illustrating an electrical system by means of which the operation of weighing apparatus may be controlled and indicated, said view showing the system at rest just before the commencement of a series of weighing operations. Fig. 3 is a sectional plan of the register-casing and the registering apparatus, illustrating the several indicating, registering, and recording devices in action and the tape-feeding means for advancing the tape also in operation. Fig. 4 is a longitudinal sectional side elevation of the same. Fig. 5 is a transverse section of the same, the section being taken in line 5 5, Fig. 3, looking in the direction of the arrow. Fig. 6 is a similar transverse section taken in line 6 6, Fig. 3, looking in the same direction and illustrating the parts in the same positions as in Figs. 3, 4, and 5. Fig. 7 is a sectional plan similar to Fig. 3, but showing the parts in the positions which they assume on the release of the stop-register and the throwing of the weighing-machine out of action after the completion of the weighing of the determined series of loads. Fig. 8 is a detail side elevation illustrating the positions of the parts of the stopping device and coöperating members of the weighing-machine after the machine is thrown out of action. Figs. 9, 10, and 11 are sectional details illustrating the construction and operation of a numbering device for embossing or imprinting on the moving tape the number of loads weighed. Figs. 12 and 13 are detail side elevations illustrating the construction and operation of the stop-register. Fig. 14 is a sectional plan illustrating the reversing mechanism employed with each of the motors shown in Fig. 2. Figs. 15 to 20, inclusive, are views, on an enlarged scale, of portions of the tape, showing the various records which may be made by the machine when working under different conditions.

Similar characters designate like parts in all the figures of the drawings.

Referring first to Fig. 1, in which are illustrated, in a general way, a transfer apparatus and the registering apparatus, E designates a grain-elevator, on the upper floor of which the grain is stored and is delivered by means of a supply chute or spout H to a weighing-machine W, located on the second floor, from which machine the material as it is weighed is discharged into an inclined chute, such as C, which may travel on suitable ways 2 and deliver the grain from the lower story of the building to a car T on tracks alongside the elevator.

O designates, in a general way, a building, such as an office, disconnected from the grain-elevator, containing the registering apparatus R, by means of which the operation of the weighing-machine W is controlled and the movements of its essential parts indicated. The several signal-circuits which form part of the indicating system are in this view indicated by the cable $c$, in which cable the several signal-wires are inclosed.

The power-main from which the current is obtained for operating the two electric motors M and M', which in the drawings of this application are illustrated for operating the main gate in the supply-chute H, and the stopping device of the weighing-machine is designated by $h$ and indicated by heavy lines, the light lines running from the register R showing the two branches of the power-circuit which lead to the motors M and M', respectively.

The weighing-machine which I prefer to employ is illustrated in Fig. 2 of the drawings and is, as to the principal features thereof, substantially similar to the weighing-machines shown and described in patents heretofore granted to me. The main frame of the machine comprises a base 3, from which rise side frames 4, (only one of which is illustrated herein,) these side frames being connected at their upper ends by the top plate or beam 5, on which the supply chute or hopper H is mounted.

Any suitable valve mechanism may be employed; but the valve which is illustrated in this figure is in the form of a stream-supporting member 72, oscillatory about an axis passing through the supply-stream, this valve being pivoted in the ends of hangers 5', (only one of which is shown,) depending from the beam 5.

The usual beam mechanism is illustrated at B and B', and these beams are pivotally carried on the base 3 by knife-edges and support in a similar manner a load-receiver G of well-known construction. This load-receiver has at its lower end an opening which is closed by a load discharger or closer L, shiftable for discharging the load and counterweighted so as to return to its normal shut position after a load has been discharged from the receiver G. The valve-closing actuator is in this instance in the form of a counterweight 90, and the usual counterweighted lever is shown at 550 for actuating the valve to open the same, the movement of this lever being transmitted to the valve by connections which, in their normal positions, will operate to open the valve, but which when the stopping device is operated to throw the machine out of action will not transmit such movement to the valve. These connections embody in this case a thrust-rod 558, having its lower end normally in position to be operated by the inner end of the lever 550 and its upper end pivoted to one end of the lever 600, the opposite end of which is in turn pivoted to the lower end of a rack-arm 605, carried by a bracket 607, projecting from one of the side beams 4.

The bracket 607 carries at its end a shaft 612, suitably journaled therein, this shaft having secured thereto a pinion 615 and a band-wheel 616, the latter of which is driven by a belt 618, carried around a band-wheel 620, fixed on short shaft 621, (see Fig. 14,) this shaft being journaled at its outer end in a bearing 622, rising from the base of the motor M, which motor is in this case supported on a shelf 610, projecting from the framework.

The shaft 621 is supported at its inner end in the journal-opening of a bevel-gear 623, fixed on the outer end of the armature-shaft 624 of the motor, and this gear meshes with a corresponding bevel-gear 625, carried by a stud journaled in a bearing 626, the gear 625 meshing in turn with a third bevel-gear 627, disposed oppositely to the gear 623. The gear 627 is mounted loosely on the shaft 621 and will of course always rotate in one direction. For the purpose, however, of rotating this shaft in either direction I have illustrated herein a shifter in the form of a coupling member 628, splined on the shaft 621, so as to rotate therewith, but slidable freely thereon and having at its opposite ends lugs or projections adapted to engage the walls of corresponding sockets in the faces of the bevel-gears 623 and 627.

In order to reciprocate the coupling member 628 on the shaft 621, I employ in connection with said coupling member a shifting lever 630, pivoted on a post 631 for oscillation in a horizontal plane, this shifting lever having at its working end pins or fingers adapted to be received in the usual manner in a peripheral groove of the coupling member to operate the latter to carry it into engagement with the one or the other of the oppositely-disposed bevel-gears. It will be clear that when the coupling member is in its middle position, to which it may be returned by springs 639, the band-wheel or driven member 620 will not be rotated, but that when the coupling member is in engagement with the bevel-gear 627 said band-wheel will be rotated oppositely to the direction of its rotation when the coupling member is in engagement with the bevel-gear 623.

The devices which I have just described constitute reversing means for reversing the direction of rotation of the driven member 620 and for shifting the valve-actuating member or thrust-rod into and out of operative relation with the stream-controller or valve 72, and as it is necessary that this reversing means be automatic in its operation, at least for the purpose of throwing the machine out of action, I have provided in the present organization means, which will be hereinafter described, for automatically controlling this reversing mechanism and for automatically reversing the last preceding movement of the driven member at any determined point in the operation of the weighing mechanism.

The connections between the motor M' and the driven member for operating the main gate in the supply-chute H are the same as those between the motor M and the driven member 620, and hence they are not shown or described in detail herein.

As hereinbefore stated, the thrust-rod 558 is not connected directly to the valve, but is so disposed relatively thereto as to be shiftable into and out of operative relation therewith—that is to say, this thrust-rod constitutes a valve-actuating member shiftable relatively to the valve from an operative to an inoperative position, and vice versa, and will, when in its inoperative position, be ineffective for actuating the valve to open the same, even though the counterweighted lever 550 may operate in its usual manner.

The lever 600, hereinbefore referred to, has pivoted thereto near the inner end thereof a link 601, the upper end of which is pivoted to a rock-arm 602, fixed relatively to the valve in substantially the same manner in which the thrust-rod is usually connected with said rock-arm. The function of this lever 600 is to connect the link and the thrust-rod and to throw one of these members into and out of operative relation with the other, the member so actuated being in this case the thrust-rod, which, as will be obvious, will be movable longitudinally to its effective and ineffective positions while being also shiftable in the usual manner transversely into and out of operative relation with the inner end of the valve-actuator 550, as in throwing said thrust-rod into position to discharge the load or to test the accuracy of the weighing mechanism. From the preceding description of the operation of the reversing means (shown in detail in Fig. 14) it will be evident that the shifting of the thrust-rod from its operative to its inoperative position will be controlled by the movements of the rack-bar 605, transmitted to the thrust-rod by the movement of the lever 600 about its point of connection with the link 601.

In the normal operation of the weighing-machine shown herein the opening movements of the valve and the load-discharger or closer will occur alternately, and hence I have provided, in connection with the parts hereinbefore described, the usual reciprocally-effective means for limiting the opening movements of the valve and the closer. At the upper side of the load-receiver is a rocker 515, and a connecting-rod 516 connects this rocker with the closer in such a manner that when the closer is shut these parts form a toggle which carries substantially all of the weight of the closer and the load supported thereby on the pivot of the rocker. The face of the rocker 515 is so shaped as to coöperate with the cam-arm 412, depending from the valve-shaft 72'. These members 515 and 412 constitute, respectively, the usual valve-opening-movement and closer-opening-movement limiters for limiting the opening of the valve by the non-closing of the closer and the opening of the closer by the non-closing of the valve.

The driven member or shaft operated by the motor M' is illustrated at 621', and it is journaled in suitable bearings on the side of the hopper H, said shaft carrying at its outer end a worm 650, adapted to mesh with the teeth of a segment 651, supported for oscillation on a shaft 652, to which is secured also one or more rock-arms 653, carrying a curved slide 654, which constitutes the main gate for opening and closing the supply-spout. It will be obvious that the rotation of the shaft 621' in the one or the other direction will oscillate this gate to open the supply-spout or close the same, as the case may be.

For the purpose of electrically indicating at the register apparatus the operation of the valve and the main gate, as well as the movements of the closer and the beam mechanism, all of these parts carry suitable circuit-controlling devices, the construction and operation of which will be described hereinafter in detail.

The indicating, registering, and recording devices of the register apparatus may all be operated from a suitable source of electrical energy—such, for example, as a battery $b$, (indicated in Fig. 2,) which battery may be contained in the base of the register-casing, (shown at R, Fig. 1.) The power-circuits to the motors M and M' will also be controlled in this case by suitable switches located in the register-casing, which latter will be locked, after the system is in operation, for the purpose of preventing tampering with the apparatus.

The principal devices included in the register apparatus for controlling and indicating the operation of the weighing-machine are a stop-register, by means of which the action of said machine may be controlled; recording devices for recording on a tape the operation of the valve, the beam mechanism, and the closer; tape-feeding means; a numbering device for embossing or imprinting on the tape the number of loads weighed; an electrically-operated coupling device for coupling the tape-feeding means to and uncoupling it from a suitable driving mechanism; time-recording means for recording time indications on the moving tape; a continuous counter or register; switches controlling power-circuits to the motors; a switch controlling the reversing mechanism for the main gate in the supply-chute; an indicator for showing the position of said main gate; an automatic make-and-break wheel in the circuits to the recording devices for the valve, the beam mechanism, and the closer, and an automatic switch in the circuit to the numbering device for closing the circuit to the latter after a series of closures of the circuit from the closer.

The starting and stopping of the operation of the weighing-machine are intended to be governed electrically from a stop-register S, which may be of the type shown and described in the patent granted to me October 29, 1895, No. 548,854. Moreover, the operation of the stop-register will be controlled by the weighing-machine, said register being in this case actuated by a solenoid included in an electric circuit controlled by the closer of the machine.

The circuit-controller at the closer may be of any suitable type, it comprising in this case an insulated yielding contact-arm 100 on the side of the load-receiver and a contact 101 on the closer and having its contact-face concentric with the axis of movement of said closer, an insulating-strip having a curved face, forming a continuation of the contact-face of the contact 101, being shown at 102.

The stop-register S embodies a stop member adapted to be released at a determined point in the operation of the machine and after a predetermined number of loads have been weighed out. The register-wheels are indicated by 12, 12', 12'', and 12''', (see Figs. 12 and 13,) and are supported and connected in the usual manner. Each of these wheels has a circuit of openings, into any one of which a pin 13, 13', 13'', or 13''' may be inserted to control the release of the stop member. These pins are intended to actuate, at the proper points in the movement of the register-wheels, angle-levers—such as 14, 14', 14'', and 14''', respectively—normally spring-pressed into engagement with corresponding stops 15, 15', 15'', and 15''', carried by the stop member, and having latches 16, 16', 16'', and 16''' for engaging said stops.

The wheel 12 is the driving-wheel of the train, and it will be clear that as these wheels are rotated the pins 13, 13', 13'', and 13''' will engage the arms 17, 17', 17'', and 17''' of the angle-levers and release the latches from the stops at the points corresponding to the indications shown by the setting of the pins. The stop member is in this case a shaft 633, carrying at its outer end an electric switch 634, controlling circuits which in turn govern the operation of the actuator-shifting means for shifting the valve-actuator or thrust-rod 558. This switch has a curved face concentric with the axis of the shaft 633, and has a contact portion insulated from said shaft and an insulated portion 634'. This switch is adapted to make contact constantly with a contact-arm 635 and to make contact alternately with either one of two shorter arms 636 and 636', which contact-arms are insulated from each other and are supported on a stud 18, projecting from the end of the stop-register. Said switch 634 is normally held by the shaft 633 with its contact-face in engagement with the contact-arm 636, but is adapted to be thrown by a spring 637 or its equivalent into contact with the contact-arm 636' when the shaft 633 is released at the end of the determined period of operation. This switch is included in a circuit from the battery $b$ through the battery-wire 30, a conductor 31, relay $l$, (the function of which will be hereinafter pointed out,) a conductor 31', and a contact-strip 34, supported by and insulated from the bracket 607 on the framework of the weighing-machine. At this point, when the weighing mechanism is operating normally and the parts are in the positions shown in Fig. 2, the circuit is broken; but if the circuit were complete the current would pass by way of an insulated contact 33 on the rack-bar 605 through a conductor 32 to an electromagnet $e$, supported on the base of the motor M, thence through a conductor 35 to the contact-arm 636, to the switch 634, and by way of the contact-arm 635 and the return-wire 40 back to the battery.

When the switch 634 is released by the rock-shaft 633 of the stop-register, the spring 637 immediately shifts the switch from the position shown in Fig. 3 to that illustrated in Fig. 7 and causes said switch to break the contact with the contact-arm 636 and make the contact with the contact-arm 636', whereupon a circuit from the battery $b$ through the battery-wire 30 is completed by the passage of the current through conductor 31, relay $l$, conductor 31', contact-strip 34, and an insulated contact 39 on the rack-bar 605, through the conductor 37 to an electromagnet $e'$, (see Fig. 14,) through conductor 38, contact-arm 636', switch 34, contact-arm 635, and return-conductor 40.

The shifter 630, (see Fig. 14,) controlling the direction of rotation of the driven member or band-wheel 620 of the reversing mechanism of the motor M, is operated in the present case by means of a duplex armature which is designated by 638 and may be formed integral with the shifter and will normally lie in a central position between the pole-pieces of the electromagnets $e$ and $e'$. It will be obvious now that on the energization of the electromagnet $e'$ by the passage of the current therethrough, as just described, the armature 638 will be drawn toward said electromagnet and the shifter will carry the coupling member 628 into engagement with the bevel-gear 627, which being then coupled fast to the shaft 621 will cause the band-wheel 620 to rotate in a direction which will start the driving connections between said gears and the rack 605 to carry said rack down from the position shown in Fig. 2 to that illustrated in Fig. 8, and also cause said rack and the lever 600 to raise the thrust-rod 558 and throw the same out of operative relation with the valve—that is to say, before the valve 72 shall have had a chance to open the thrust-rod will have been carried into the position which it would normally assume after being operated by the counterweighted lever 550 to open the valve. This will be clear by reference to Fig. 8. Just before the rack reaches the limit of its downward movement the contact 39 is carried off from the lower end of the contact-strip 34, whereupon the circuit is broken and the shifter 630 is returned by the springs 639 to its normal idle or middle position by the de-energization of the electromagnet $e$, thus causing the uncoupling of the bevel-gear 627 and the coupling member 628, and consequently the stoppage of the rotation of the band-wheel 620.

It will be noticed that the contact 39 constitutes an automatic circuit-breaker controlled by the movements of the rack, and, as will hereinafter appear, the contact 33 is a similar automatic circuit-breaker operative for stopping the upward movement of the rack when the machine is thrown into action again. Hence it will be evident that I employ automatic circuit-breaking means for breaking alternately a pair of circuits controlling the movements of suitable shifting means for throwing a valve-actuator into and out of its effective position. While of course each of the contacts 33 and 39 is operative for making the circuit as well as for breaking it, (as is also the switch 634,) yet it will be clear from the foregoing description of the operation of these parts that the switch 634 constitutes a circuit-maker and is not in all of its operations entirely automatic in character, owing to the fact that it is set by hand to start the machine and throw it into action, while the contacts 33 and 39 are circuit-breakers, and both are automatic in their action. Moreover, while each said circuit-breaker controls the operation of the actuator-shifting means, yet each in turn is controlled by such means and is movable therewith.

The principal devices of the register apparatus may be inclosed within a rectangular box at the top of the casing R, (illustrated in Fig. 1,) and this box will preferably have a glass cover 20, (see Fig. 4,) through which the operation of the various parts may be inspected at any time. Moreover, most of these devices will be supported by a suitable metallic framework, (designated in a general way by F and clearly shown in Figs. 3 to 6 of the drawings.)

The tape $t$, on which the record of the operation of the machine is made, is carried in the present construction on a bobbin or reel 42, supported on a stud 43 at the left-hand end of the bed 21 of the framework. The tape is wound around the bobbin 42 in the form of a large roll and is fed from the paper roll by a feed-roll located near the right-hand end of the box. This feed-roll constitutes a part of tape-feeding means which will be driven at a uniform rate of speed by suitable driving mechanism, preferably a clock-train, (indicated herein at D.) As this train may be of any well-known construction the details thereof are not illustrated herein; but it embodies a wide-faced pinion 44, supported on the end of a driven arbor, (indicated at 45, Fig. 3, by dotted lines,) and this pinion meshes with the teeth of a spur-gear 46, supported for rotation on a spindle 47, carried by the frame of the clockwork, said spur-gear having a sliding movement on said spindle. The hub of this spur-gear is toothed to form a coupling member adapted to couple said spur-gear to and uncouple it from the driving member 48' of the tape-feeding means, and this driving member is in the present case supported on the end of the spindle 47 and secured to a wheel 48 for recording time indications on the tape.

The time-recording wheel is preferably of substantially the same width as the tape and has a peripheral groove, from the inner wall of which project pins for perforating the tape, and thereby recording time indications thereon. The wheel 48 is intended in the present instance to be driven by the clockwork D at such a rate as to make one complete rotation every five minutes, and the perforating-pins are so disposed around the wheel as to divide this period of five minutes into minute intervals and the minute intervals into intervals of twelve seconds, the twelve-second intervals being indicated on the tape by single punctures, the minute intervals by double punctures, and the five-minute intervals by triple punctures, these different indications being of course produced by disposing the pins properly about the time-recording wheel, the shorter intervals being indicated by single pins, the minute intervals by two pins, and the five-minute intervals by three pins. These pins are indicated by $p$ and should project beyond the major diameter of the wheel 48 a distance sufficient to enable them to pass entirely through the tape and puncture the same, and the peripheral groove in said wheel 48 will form a space into which the central portion of the tape may be pressed slightly and from which it may be drawn clear of the pins by the outer surface of the wheel at opposite sides of said groove. The tape may be held up against the under side of the time-recording means by means of a presser-roll 49, supported on a rock-arm 50, pivoted to the bed 22 of the framework F and connected at its free end by means of a spring 51 with a spindle 52, also supported by the clockwork-frame. This spindle may have supported thereon a guide-roll, such as 53, for preventing strain upon the tape at this point. The operation of this presser device will be obvious.

In Figs. 4 and 5 I have illustrated a series of idle-gears 54, 55, and 56 for communicating motion to a bevel-gear 57, supported on a short-arm 58, journaled in the lower end of a hanger 23, depending from the under side of the bed 22, the gear 56 being carried also by the short shaft 58. The bevel-gear 57 meshes with a corresponding bevel-gear 59, carried at the end of a long shaft 60, journaled at one end in a hanger 24, also depending from the under side of the bed 22, and at its other end in bearings at the end of a bracket 61', projecting from an upright 61, rising from the bottom of the box in which the devices just described are contained. This standard is preferably U-shaped and carries two parallel shafts disposed transversely to the long shaft 60, these two shafts being designated, respectively, by 62 and 63. The lower shaft 62 carries a bevel-gear 65, which meshes with a corresponding bevel-gear 64 on the end of the shaft 60, and also has a spur-gear 66 in mesh with the corresponding spur-gear 67 on shaft 63. The gear 67 is not fixed on this latter shaft, however, but is frictionally coupled thereto, friction disks or rings being clearly shown in Fig. 6 at opposite sides of the gear 67 for this purpose. The friction of these rings against the gear will of course be regulated, as by means of the adjusting-nut 68. At the opposite end of the shaft 63 is a feed-roll, (designated herein by 69,) by means of which the tape is fed from the left to the right hand end of the register, and it will be obvious that if an abnormal resistance is exerted to oppose momentarily the advance of the tape the friction-rings will permit the gear 67 to slip between them without turning the feed-roll 69. Another guide-roll is shown at 73 a short distance above and in the rear of the feed-roll 69, this guide-roll being supported on a stud 74, carried by a bracket 26, rising from the right-hand end of the lower portion 25 of the bed of the framework.

In order to form a proper record of the action of the several parts of the weighing-machine, the tape $t$ should be advanced continuously during the whole of the time that the weighing-machine is in operation—that is to say, during the whole of the time between the throwing of the machine into action and the throwing of the same out of action by the stopping device. As it is not necessary, however, to feed the tape except during this period of time I deem it desirable to couple the tape-feeding means to the driving mechanism therefor on the starting of a series of weighing operations and to uncouple such mechanisms when the stopping device operates to stop the action of the machine. Hence it will be clear that the coupling and uncoupling of the tape-feeding means may be controlled electrically by the movements of a determined part of the shifting means for controlling the opening movement of the valve 72, and in the drawings of this case the movement of the rack-bar 605 is utilized for this purpose. The rack-bar has in this instance a switch-arm 105 at the lower end thereof and insulated therefrom, this switch-arm being connected by a conductor 106 with the battery-wire 30. It will be apparent that this contact will travel up and down with the rack-bar, and if two contacts are positioned at such a distance apart as to correspond to the range of movement of the rack-bar and are located in the path of movement of the switch-arm 105 they may constitute terminals of electric circuits controlled by the movements of the switch 105. Such contacts are represented herein at 107 and 108, they being located at the proper points on an insulated bar or strip 109, secured to the bracket 607 of the frame of the machine, which strip is parallel with the rack-bar 605. These two contacts on the bar 109 are intended to control corresponding circuits in which are included electromagnets for governing the coupling and uncoupling of the tape-feeding means and the driving mechanism therefor. Said electromagnets are designated herein at $d$ and $d'$ and are supported on the bed 22 of the framework of the register apparatus adjacent to the clockwork and the time-recording wheel. These electromagnets are designed to operate a shipper-lever controlling the movements of the coupling member 46'. The shipper-lever which I prefer to employ for this purpose is indicated herein at 75 and is pivoted on the bed 22, so as to oscillate between the poles of the electromagnets, the fingers of the shipper preferably operating by contact with opposite sides of the spur-gear 46, and is shown clearly in Fig. 3. The shipper 75 will of course carry the usual armature 75', by means of which it will be operated.

If the weighing-machine is in action, the switch 105 will lie on the contact 107 and a circuit from the battery will be closed through the battery-wire 30, conductor 106, switch 105, contact 107, conductor 110, electromagnet $d$, conductor 112, and return-conductor 40, and the shipper-lever 75 will couple the tape-feeding means to the driving mechanism or clock-train. On the other hand, if the weighing-machine is out of action and the stopping device is in the position shown in Fig. 8 the switch 105 will lie on the contact 108 and the circuit from the battery will be closed through the battery-wire 30, conductor 106, switch 105, contact 108, conductor 113, electromagnet $d'$, conductor 112, and return-wire 40 and the shipper-lever will ship the gear-wheel 46 and the coupling member 46' to disconnect the tape-feeding means and the clock-train. (See Fig. 7.)

The circuit-controller, by means of which the operation of the load-discharger or closer L is governed, has been described. Those employed for the valve and the beam mechanism are substantially similar, the former comprising an insulated yielding contact-arm 114, adapted to coöperate with a contact-strip 115 and an insulating-strip 116, both concentric with the axis of movement of the valve, while the latter comprises an insulated yielding contact-arm 117 on the beam B and a contact-strip 118 and an insulating-strip 119 on the framework of the weighing-machine. These three circuit-controllers are included in circuits leading to corresponding recording devices adapted to record on the tape $t$ the action of the valve, the beam mechanism, and the closer.

As hereinbefore stated, the recording devices which I prefer to employ are in the form of choppers or knives, which will cut the tape transversely in parallel lines. The electromagnets, by means of which these recording-knives are operated, are indicated herein at $f$, $f'$, and $f''$, and are supported on the bed 27 of the framework of the register apparatus. (See Fig. 5.) The recording-knives are designated by $k$, $k'$, and $k''$ and are shown clearly in said figure. They may be carried at the ends of rock-arms 76 76' 76'', supported for oscillation above and adjacent to the electromagnets $f$, $f'$, and $f''$, these rock-arms, of course, carrying suitable armatures to permit them to be operated by said electromagnets. In the construction illustrated herein the rock-arms are mounted for oscillation on a carrier-rod 77, supported by ears 78, rising from the bed 22. The downward movements of the rear ends of these rock-arms will be limited—as, for example, by means of a stop-rod 79—springs, such as 80, being employed for normally holding the rock-arms with the knives elevated.

If the recording-knives were operated but a single time on each closure of the circuit by the corresponding circuit-controller at the valve, the beam mechanism, or the closer, it would be evident that the record would be of little value, as it would be extremely difficult to understand it, and hence I make use of a rapidly-moving automatic make and break for interrupting and closing these circuits at a rapid rate during the whole of the time that the tape is advancing. This device may be in the form of a make-and-break wheel controlling all three of the circuits and it is indicated herein at $m$. In this case it consists of an insulated wheel having metallic contacts set therein, three sets of such contacts being shown, each set comprising four equidistant contact-points. This wheel is in rubbing contact with corresponding contact-strips constituting terminals of the respective circuits from the valve, the beam mechanism, and the closer, the construction and use of which contact-strips are well understood and will be apparent by reference to Figs. 3 and 4. This make-and-break wheel is carried and operated in the present case by an arbor of the clock-train and will be rotated at such a rate of speed as to cause the recording-knives to puncture the tape on lines relatively close together, and fly away from the paper after each chop, so as to prevent interference with the advance of the tape. The record made by these knives is shown in Figs. 3 and 7 and also in detail on an enlarged scale in Figs. 15 to 20, inclusive. In this series of figures the intervals between the time indications made by the time-recording wheel are of course always the same, as said time-recording wheel is driven at a uniform rate of speed by the clockwork. As before stated, the perforations indicate intervals of twelve seconds each, which intervals correspond substantially to the time-record for a complete cycle of operation of the weighing-machine. The upper row of cuts made by the recording-knife shows when the valve is open; the second row shows the length of the drip period, which corresponds to the time it takes for the beam mechanism to descend to the overpoising or cut-off point, and the third row indicates the length of time the load discharger or closer is open. Of course the difference between the whole time that the valve is open and the time required for the beam mechanism to descend is the period during which the valve is wide open and the full stream is supplied to the load-receiver. As the actions of the valve and the load-discharger are reciprocal, the valve beginning to open as soon as the closer is shut and the closer beginning to open as soon as the valve is shut, in the normal operation of the machine the normal record will of course be one in which the record of the valve action takes up the entire length of the tape between two successive records of the closer action, and hence in which the record of the closer action occupies the entire length of the tape between two successive records of the valve action.

Figure 15:
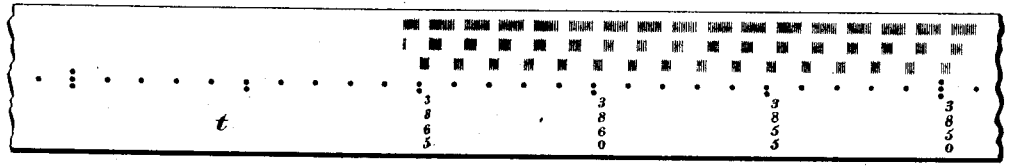

In Fig. 15 is shown a section of the tape containing a record of the normal action of the weighing-machine, in which the complete cycle of operation—that is to say, the valve action plus the closer action—takes twelve seconds, the interval between two adjacent time indications on the tape.

Figure 16:
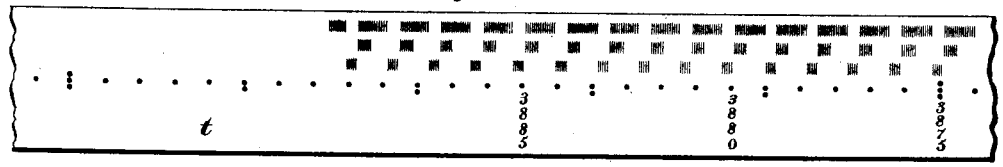

Fig. 16 shows a record produced by sluggish or slow-running material. The timing is uniform, but the time consumed by the cycle of operation is considerably longer than that shown in Fig. 15. The action recorded in Fig. 16 could also be caused by the supply-valve being partially closed.

Figure 17:
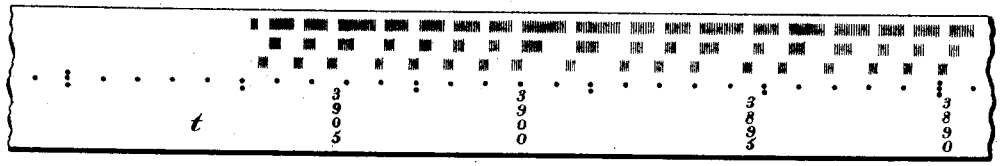

Fig. 17 shows a record made by the machine when material of varying specific gravities is supplied thereto or material which has a tendency to cake and flow at varying rates of speed. Some of the cycles of action are of normal length and others are considerably longer.

Figure 18:
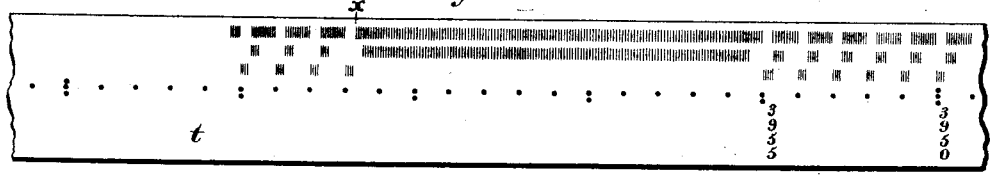

Fig. 18 shows a record caused by the valve becoming wedged open by some foreign material—as, for example, a stick of wood. After the last action of the closer before this accident the valve opens as usual and the recording device for the beam mechanism starts its record in proper time; but as the valve is unable to close on account of the obstruction both the recording device for the valve and that for the beam mechanism are kept in continuous action and the opening of the closer is prevented. At the point $x$, Fig. 18, the attendant is supposed to have discovered and removed the obstruction, whereupon the valve immediately closes and the closer opens. The machine then continues its normal action.

Figure 19:
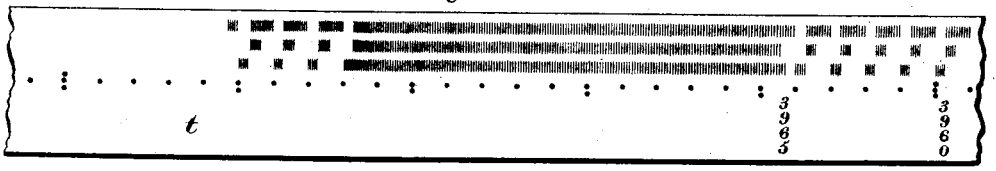

If from any cause, such as wear, the interlocking segment or rocker 515 fails to be latched by the usual closer-latch 88, this fact will be at once recorded by the closer-recording knife, as shown in Fig. 19. Moreover, the failure of the rocker 515 to be latched clear of the stop 412 on the valve will, by the pressure it exerts against said stop 412, prevent the closing of the valve, so that the record on the tape will show continuous cuts for the valve, the beam mechanism, and the closer.

Figure 20:
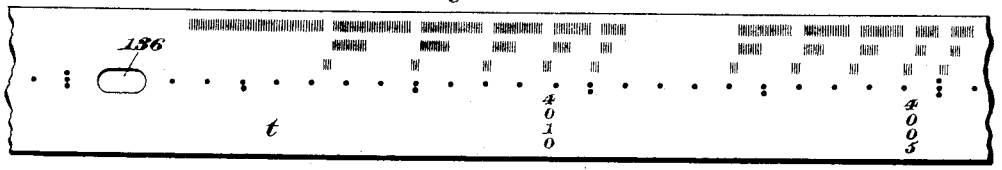

In Fig. 20 is shown the record made on the tape when the weighing-machine is supplied with material from a bin that is nearly empty. The first two records made in this figure show the normal action. Then as the material begins to flow more slowly the time for a cycle of movement is increased, and this is followed by a noticeable break or stop in its action. Then more material having been dislodged the machine starts again in normal action, slowly increasing the time of the record for a cycle of operation until on the exhausting of the bin the action of the machine ceases. This may take place at any point in the operation at the end of the cycle of movement or, as shown in Fig. 20, with the valve open and only a small portion of a full load in the receiver G. The fact that the valve is wide open will continue to be recorded on the tape until the record is observed and the matter attended to by the operator.

The numbering device, the stop-register, and the counter, as well as the recording-knife $k''$, are controlled by the circuit from the closer; but as the electromagnet for the numbering device and the solenoids for the stop-register and counter should be operated not more than once on each opening of the closer it will be clear that they cannot be placed in series with the electromagnet $f'''$, but should be arranged in parallel in the closer-circuit, and preferably all four of these devices are in parallel with each other.

The stop-register and the counter will be operated, respectively, in the construction shown herein by solenoids $s$ and $s'$, supported on the framework of the register apparatus, as shown in Figs. 3, 4, and 6, and the core of each solenoid is mechanically connected with the units-wheel of each register-train for operating such wheel. The connections between the solenoid $s$ and the units-wheel of the stop-register S comprise a link 81, (see Fig. 3,) pivotally connected with the end of the core of said solenoid, a rock-arm 83, fixed to the shaft of the units-wheel 12 and pivotally connected with said link, and a spring-pressed pawl 84 for operating the ratchet-wheel for turning the units-wheel step by step. The core of the solenoid will be retracted to its normal position by means of a spring, and the rock-arm 83 is shown as a spring-retracted one for this purpose. The connections between the solenoid s' and the counter S' are substantially similar to those just described and embody a link 85, pivoted on the framework and slotted at its end to straddle a pin on a rock-arm 86 for operating the units-wheel of the counter. This link 85 will also be slotted near its center to receive a pin 87, projecting from the core of the solenoid, these parts also being spring-retracted in a manner which will be hereinafter described.

The numbering device is designated herein by $n$ and, as before stated, is controlled by an electromagnet in parallel with the solenoids in the circuit from the closer. This electromagnet is shown at $g$ and is mounted in an opening in the head 22 of the framework, it being held in place in any suitable manner, as by means of clips 89. The numbering device may be of any suitable construction and will be mounted for oscillation on one end of a lever 91, supported for oscillation on the bed 22 and counterweighted at its opposite end, so as to hold the numbering-head normally out of contact with the tape.

The numbering-head is covered by a suitable casing 92, in which the numbering-wheels—in the present case four in number—are mounted on a carrier-pin 93. As it is my intention to print on the advancing tape the number of loads weighed, after every fifth load the first wheel 94 of the numbering-train will contain only the figures "0 5" repeated, while the wheels 94', 94'', and 94''' contain all of the numerals in sequence. Hence the tens-wheel will be turned one step after every other step in the movement of the units-wheel instead of after each complete rotation of the units-wheel, as is the case usually. The numbering-wheels are operated by ratchet-wheels 95, 95', 95'', and 95''', secured, respectively, to the respective wheels 94, 94', 94'', and 94''', and each of these ratchet-wheels is operated by a corresponding pawl 96, 96', 96'', or 96''', pivoted on the end of a tumbler 97, 97', 97'', or 97''', all of which tumblers are supported for oscillation on a carrier-pin 98 and have stop-arms projecting therefrom and normally spring-held against the upper inner side of the casing 92. The lower ends of these tumblers are in the paths of movement, respectively, of five pins 99 on the numbering-wheel 95 and pins 99' and 99'' on the numbering-wheels 95' and 95''. The springs which hold the tumblers in their normal positions may also form detent-pawls for holding the ratchet-wheels against return movement. These springs are clearly shown at 92', Figs. 10 and 11.

For the purpose of actuating the units-wheel of the numbering device an operating-pin 120 is shown in position to be actuated by a fixed arm 121, secured to the bed 22, the units-wheel being turned one step each time the numbering-head rises from the paper, when the circuit to the electromagnet $g$ is broken and the counterweight 92'' becomes operative. The lever 91 will of course carry the usual armature in position to coöperate with said electromagnet.

In order that the numbering device may be actuated after the weighing of every fifth load by the machine and at no other time, I intercalate in the branch containing the electromagnet $g$ an automatic switch, which will close the circuit to said magnet only at every such fifth operation of the weighing-machine, and this switch may be operated mechanically from the solenoid $s'$. This switch is designated in a general way by $a$, and it is clearly illustrated in Fig. 3, it comprising in the construction illustrated a rotary wheel of insulating material having contacts at diametrically opposite points in its periphery, a yielding contact-arm being shown at 122 in contact with the periphery of said wheel. This automatic switch is mounted on the bed 22 and will be rotated by a ratchet-wheel 123, having ten teeth, so that the contact-arm 122 will make the circuit to the electromagnet twice during a complete rotation of the switch-wheel, this wheel being rotated step by step, one tooth at a time, every time the closer is opened to discharge a load and the counter operated to register the same. The step-by-step movement of the wheel is imparted thereto by a spring-pressed pawl 124, carried by a lever 175, which is operated by a link 126, pivotally connected with the core of the solenoid $s'$, return movement of the ratchet-wheel 123 being prevented by a spring-pressed detent-pawl 127, and the lever 175 and the core of the solenoid being retracted to their normal positions by a coiled spring 128. (See Figs. 3, 4, and 6.) It will be evident, of course, that while, in the organization illustrated in the drawings, the numbering device is operated after every fifth load is weighed the interval between the movements of the numbering device may be any desired one.

From the foregoing description of the operation of the several devices included in the circuit from the closer it will be seen that not only will the weighing of each individual load be registered by the two counters, but that the recording device of the closer will be vibrated rapidly on every such closure of the closer-circuit, while the numbering device will be operated only at every fifth closure of such circuit.

As hereinbefore stated, the register-casing also incloses suitable means for controlling the opening and the closing of the main gate 654 in the supply-chute H and for indicating when such gate is open or shut and also switches in the branch power-circuits to the motors M and M'. The direction of rotation of the driven member 621' for operating said main gate is governed by reversing means identical in construction with that illustrated in Fig. 14, and this reversing means is in the present case controlled by a switch-lever $j$ in the register-casing, said lever being movable from one to the other of a pair of contacts 129 and 129' in circuit, respectively, with a pair of electromagnets $r$ and $r'$ and with a second pair of electromagnets $o$ and $o'$, corresponding to the electromagnets $e$ and $e'$. The switch-lever $j$ carries an armature controlled by the respective electromagnets $r$ and $r'$ and will be spring-held normally in a central position out of contact with the terminals 129 and 129'. When this switch is thrown to one side or the other, however, for the purpose of coupling the driven shaft 621' with the armature-shaft of the motor M', it will be held on the contact-terminal by the proper electromagnet $r$ or $r'$ until the main gate shall have been fully opened or shut and the circuit shall have been broken at the supply-chute. For the purpose of breaking these circuits to the electromagnets $r$ and $r'$ on the completion of the opening and the closing of the gate 654, and thereby uncoupling the shaft 621' from the motor, I make use of an automatic switch 130, oscillatory with and insulated from the shaft 652. This switch is adapted to make a sliding contact with each one of a series of three contact-strips 131, 131', and 132, concentric with the axis of the shaft 652 and carried on a switch-board $u$. Another automatic switch 133, similar to that shown at 130, moves with the shaft 652, and it controls a pair of contact-terminals 134 and 134', also on the switch-board $u$. The construction and operation of this switchboard and the automatic switches coöperating therewith will be evident by referring to Fig. 2. The terminals 134 and 134' are connected by conductors 135 and 135' with a pair of electromagnets $i$ and $i'$, and these electromagnets control an indicator in the form of a pointer $i''$, which indicates visually on a dial $d''$ when the main gate is open or shut. This indicator may be spring-pressed to return the same to its central position between the electromagnets $i$ and $i'$ in case of a break in either circuit.

The power-circuit, which enters the office and the register-casing at $h$, is divided into two branches within the casing, one of which, that to the motor M', may be controlled by an ordinary hand-operated switch $v$, while that to the motor M may be controlled by the relay $l$, to which reference has been made.

For the purpose of indicating to the attendant when the roll or strip of paper is used up I provide in the tape near the end thereof a slot, such as 136, through which a contact-arm, such as 137, which normally rests on the tape, may project and complete a circuit through a contact 138 to a bell $b'$, which will sound an alarm, so that another roll may be inserted at the proper time. Moreover, as it is frequently necessary to employ the weighing-machine for weighing for a considerable period of time, I also prefer to provide means for throwing the stop-register S' out of action, so that it will operate as a simple counter. For this purpose I may secure to the stop member 633 of the stop-register a rock-arm 139, (see Fig. 6,) which may be engaged by a swinging stop 140 to lock the shaft 633 in the position shown in said figure.

The operation of a registering apparatus constructed in accordance with my system, as herein illustrated, is as follows: So far as the construction of the apparatus shown in the drawings of this application is concerned the exact order in which the switches $j$ and 634 are set and the switch $v$ thrown is immaterial. It is assumed, however, that the stop-register is set first, and therefore the switch 634, and that after the valve has been opened the switches $j$ and $v$ will be operated. As at the beginning of each new series of operations and before the stop-register is reset the valve will be closed, owing to the fact that the rack-bar 605 is in its lowermost position (shown in Fig. 8) and the thrust-rod 558 in its uppermost position, it will be clear that the first effect on the setting of the register will be to close a circuit from the battery $b$, through conductor 31, relay $l$, conductor 31', contact-strip 34, switch-arm 33, conductor 32, electromagnet $e$, conductor 35, contact 636, switch 634, contact 635, and return-conductor 40. The passage of this current causes the energization of the electromagnet of the relay and of the electromagnet $e$, thus causing the power-circuit from the power-main, through branch conductor 141, to the motor M, conductor 142, switch-arm 143, and conductor 144 to be closed. At the same time the energization of the electromagnet $e$ by the signal-circuit causes the coupling of the band-wheel 620 with the bevel-gear 623, (see Fig. 14,) and through the driving connections from the band-wheel 620 the rack-bar 605 is carried from its lowermost to its uppermost position, upon reaching which the signal-circuit is broken by the passage of the switch-arm 33 off from the contact-strip 34, thus deënergizing the relay and the electromagnet $e$ and causing the uncoupling of the shaft 621 from the motor M and the interruption at the relay of the power-circuit to said motor. On reaching the limit of its upward movement the switch 105 on the rack-bar 605 is carried onto the contact 107, and thereupon a circuit is closed from the battery through the battery-wire 30, conductor 106, switch 105, contact 107, conductor 110, electromagnet $d$, conductor 112, and return-conductor 40, thus causing the energization of the electromagnet $d$ and the coupling of the tape-feeding means to the clock-train, whereupon the connections between the clock-train and the feed-roll 69 cause the rotation of the latter to advance the tape $t$ at a uniform rate of speed, and simultaneously therewith the time-recording wheel 48 begins to rotate, and the pins $p$ record time indications on the tape. As long as the weighing-machine is in action the tape-feeding means and the time-recording wheel will remain coupled to the clock-train and will be operated thereby.

As soon as the valve is open and the weighing-machine is in condition for weighing material delivered thereto the switch $v$ is thrown to close a circuit through conductor 145, the switch-contacts at the under side in Fig. 2, conductor 146, motor M′, conductor 147, the contacts at the upper side of the switch $v$, and conductor 148, and the motor, being energized, is started. The switch $j$ is now moved over to bring its contact-point on the contact-terminal 129′, whereupon a circuit from the battery is closed through the battery-wire 30, contact-strip 132, switch-arm 130, contact-strip 131′, conductor 149, electromagnet $o'$, conductor 150, electromagnet $r'$, terminal 129′, switch $j$, conductor 151, conductor 152, and return-conductor 40, thus coupling the shaft 621′ to the armature-shaft of the motor M′, so that said shaft 621′ will be rotated to open the main gate 654. While this signal-circuit is closed, the electromagnet $r'$ will hold the switch $j$ on the terminal 129′, but by the time the main gate is wide open the switch 130 will have passed off from the contact-strip 131′ and will have broken the circuit at that point, whereupon the switch $j$ will be returned to its normal central position out of contact with the terminals 129 and 129′, owing to the deënergization of the electromagnet $r'$. The breaking of the circuit by deënergizing the electromagnet $o'$ will also cause the uncoupling of the shaft 621′ from the armature-shaft of the motor M′ and thereupon the driven shaft will stop rotating. The oscillation of the shaft 652 to the position it assumes when the main gate 654 is open also carries the switch 133 off from the contact 134′ across the intervening insulating material of the switchboard $u$ and onto the opposite contact 134, whereupon a circuit from the battery is closed through the battery-wire 30, contact-strip 132, switch 133, contact-terminal 134, conductor 135, electromagnet $i$, conductor 152, and return-wire 40, thereby energizing the electromagnet $i$ and moving the indicator $i''$ from the indication "Shut" on the dial $d''$ to the opposite indication, "Open," thus showing to the attendant at the register apparatus remote from the weighing-machine that the main gate by which the supply of material to the latter is controlled is wide open and supplying material to the machine. The operator will now throw the switch $v$ to interrupt the branch power-circuit to the motor M′, and will lock the door of the register-casing, so that the operation of the registering apparatus cannot be tampered with during the weighing of a series of loads.

At the beginning of a series of weighing operations the numbering-wheels of the two registers will of course stand at the zero indication, ready to be operated by the closer on the weighing of successive loads. As the valve 72 is now wide open, it having been operated to that position by the lever 600 on the ascent of the rack 605, the yielding contact-arm 114 will lie on the contact-strip 115 and will close a circuit from the battery, through the battery-wire 30, conductor 153, contact-strip 115, contact-arm 114, conductor 154, make-and-break $m$, conductor 155, electromagnet $f$, conductor 156, conductor 157, and return-wire 40, which circuit will be rapidly made and broken by the rotation of the make-and-break wheel $m$, and the knife $k$ vibrated at a correspondingly rapid rate, so as to record on the advancing tape $t$ by means of parallel cuts close together the fact that the valve is open.

After the major portion of the load has been delivered to the bucket the latter will begin to descend, and as soon as the beginning of the drip period is reached, when the valve is held against further closing movement—as, for instance, by means of the usual drip-lever and by-pass stop (not shown herein)—the counterweighted side of the beam B will rise and the yielding contact-arm 117 will ride onto the contact-strip 118 of the framework of the machine, whereupon a circuit will be closed from the battery through battery-wire 30, conductor 158, contact-arm 117, contact-strip 118, conductor 159, make-and-break $m$, conductor 159′, electromagnet $f'$, conductor 160, conductor 157, and return-wire 40, this circuit being made and interrupted by the automatic make-and-break $m$ and the knife $k'$, operated in substantially the manner just described with reference to the recording action of the knife for the valve, a second series of cuts parallel with the record of the valve action being produced on the tape by this knife $k'$. This record will be made, as hereinbefore stated, during the making of the record of the valve action.

As soon as the load in the receiver G is completed and the latter descends below the poising-line the valve is shut, the closer opened, and the load discharged, the load-receiver and the beam mechanism rising and returning to their normal positions as soon as the first portion of the material is discharged, so that the circuits at the valve and at the beam mechanism will be broken practically simultaneously. At the same moment the yielding contact-arm 100 rides onto the contact-strip 101, and a circuit is made from the battery through battery-wire 30, conductor 161, contact-arm 100, contact-strip 101, conductor 162, make-and-break $m$, conductor 163, electromagnet $f'''$, conductor 157, and return-wire 40, the rapid making and breaking of the circuit by the make-and-break wheel causing the recording-knife $k''$ to vibrate in the manner hereinbefore described and cut in the advancing tape $t$ a series of incisions below the record of the beam action and following on after the record for the valve and the beam and normally forming a complementary record, which with the record for the valve and the beam will show the working of these parts of the weighing-machine and hence the entire cycle of operation of the latter. Two other circuits from the closer are also made on the opening of the closer, and both of these follow the same path as that just described until they reach the point 162' in the conductor 162, whence the current passes, by way of the conductor 164 and conductor 165, to the point 165' in said conductor 165, where the circuit again divides, one branch passing, by way of conductor 166, solenoid $s$, and return-wire 40, back to the battery, while the other branch goes, by way of conductor 165, through solenoid $s'$, conductor 167, and return-wire 40. The energization of the two solenoids caused by the passage of the current through the parallel circuits serves to operate the connections to the units-wheels of the two counters S and S', and thereby register the weighing of the load.

On the closing of the load-discharger L the circuits to the electromagnet $f'''$ and the solenoids $s$ and $s'$ will be broken, and all the parts controlled thereby will be returned to their normal idle positions. At the same time the record of the closer action will cease, and the valve being reopened by the action of the counterweighted lever 550 the signal-circuit from the valve will be made again, and the sequence of operations just described repeated.

During the weighing of the first four loads of the series the automatic rotary switch $a$ will be turned one step at a time by the mechanical connections from the core of the solenoid $s'$, and the circuit to the electromagnet $g$, controlling the operation of the numbering device, will not be closed; but on the discharge of the fifth load from the weighing-machine and at every fifth load thereafter the contact-arm 122 will sweep across the end of the contact-strip of the switch-wheel, as shown in Fig. 7, and momentarily make and immediately thereafter break a circuit to the electromagnet of the numbering device. This circuit follows the same course as all of the other circuits from the closer until the point 162' is reached, whereupon the current passes by way of conductor 164, electromagnet $g$, conductor 168, switch $a$, contact-arm 122, conductor 152, and return-wire 40, back to the battery. The electromagnet $g$ is now energized and the numbering device brought into contact with the tape $t$ to imprint thereon the number of loads weighed by the machine. It will be obvious that at the beginning of the operation of the apparatus the units-wheel should be so set that the figure "5" will be at the printing-point thereof, the several wheels being automatically turned mechanically from time to time on the return of the numbering-head to its normal idle position after printing.

After the weighing-machine has discharged therefrom the number of loads for which the stop-register may have been set—in this case twelve hundred and fifty loads (see Fig. 7)—the stop member of the shaft 633 is released by the release of the stops 15, 15', 15'', and 15''' from the corresponding latches 16, 16', 16'', and 16''', and the switch 634 is thrown by the spring 637 from the position shown in Fig. 3 to that indicated in Fig. 7, whereupon a circuit from the battery is closed through battery-wire 30, conductor 31, relay $l$, conductor 31, contact-strip 34, switch-arm 39, conductor 37, electromagnet $e'$, conductor 38, contact-arm 636', switch 634, contact-arm 635, and return-wire 40, thus causing the energization of the electromagnet $e'$ and the relay $l$. The energization of the former causes the coupling of the driven shaft 621 to the bevel-gear 627, (see Fig. 14,) and upon the closing, by the relay, of the branch power-circuit to the motor M the driven shaft 621 and the band-wheel 620 are rotated in a direction to cause the rack to descend to its lowermost position and raise the thrust-rod 558 to the position indicated in Fig. 8, where it will be ineffective to open the closed valve. As soon as the rack-bar reaches the limit of its downward movement the switch-arm 39 rides off from the contact-strip 34 and breaks the circuit, thus de-energizing the electromagnet $e$ and that of the relay and causing the interruption of the circuit to the motor M and the uncoupling of the shaft 621 from the bevel-gear 627. The downward movement of the rack-bar also carries the switch-arm 105 off from the contact 107 and on to the contact 108, thus closing a circuit from the battery through battery-wire 30, conductor 106, switch-arm 105, contact 108, conductor 113, electromagnet $d'$, conductor 112, and return-wire 40, whereupon said electromagnet is energized, and the shipper-lever 75 by shifting the spur-gear 46 uncouples the tape-feeding means from the clock-train, and thereby stops the advancing movement of the tape and the rotation of the time-indicating wheel 48.

If after a series of loads have been weighed the machine is not to be used again for some time, the main gate may be closed; but if the machine is to start on another series the stop-register will be reset for the proper number of loads, and the mechanism will start operating again, as hereinbefore described.

In Fig. 7 the counter S' indicates that twenty-five hundred loads have been weighed by the machine, while the stop-register indicates only twelve hundred and fifty, which shows that two series of twelve hundred and fifty loads each have been weighed successively by the machine.

When the main gate is to be shut, the switch $j$ is moved over to the contact 129, whereupon a circuit from the battery is closed through the battery-wire 30, switch 130, contact-strip 131, (on which said switch rests when the main gate is open,) conductor 169, electromagnet o, conductor 170, electromagnet r, contact 129, switch j, conductor 151, conductor 152, and return-wire 40. The electromagnets o and r being now energized, the former will couple the shaft 621' to the armature-shaft of the motor M', so as to rotate the former in the reverse direction to that described for opening the main gate, while the electromagnet r will hold the switch j on contact 129. The attendant will now throw the switch v to close the power-circuit to the motor M', whereupon the shaft 621' will be rotated and the main gate closed. When the parts reach the position shown in Fig. 2 and the circuit to these two electromagnets is opened by the riding of the switch off from the contact 131, the switch j will return to its normal central position, breaking contact at the terminal 129, and the switch 133 will have moved from the contact 134 on to the terminal 134', thus closing a circuit through battery-wire 30, contact-strip 132, switch 133, contact-terminal 134', conductor 135', electromagnet i', conductor 152, and return-wire 40, the electromagnet i shifting the pointer i'' from the word "Open" to "Shut" on the dial d'', thus showing to the attendant that the main gate is closed. The switch v will now be thrown to break the power-circuit to the motor M and the register-casing locked until the weighing-machine and the register apparatus are to be used again.

It will be apparent that if at any time during the operation of the machine a circuit is interrupted by accident—as, for instance, by the breaking or cutting of a wire when the circuit therethrough should be closed—this fact will also be indicated at the register apparatus, in most cases by the failure of the parts included in such circuit to operate properly.

Having described my invention, I claim—

1. The combination, with automatic weighing apparatus embodying a valve and a shiftable load-discharger, of a pair of electric circuits; a pair of separately-operable automatic circuit-controllers governed, respectively, by the valve and the load-discharger and controlling said respective circuits; and indicating devices controlled by said respective circuits.

2. The combination, with automatic weighing apparatus embodying a valve and a shiftable load-discharger, of a pair of electric circuits; a pair of separately-operable automatic circuit-controllers governed, respectively, by the valve and the load-discharger and controlling said respective circuits; and recording devices controlled by said respective circuits.

3. The combination, with automatic weighing apparatus embodying a valve and a shiftable load-discharger, of a pair of electric circuits; a pair of separately-operable automatic circuit-controllers governed, respectively, by the valve and the load-discharger and controlling said respective circuits; tape-feeding means; and recording devices controlled, respectively, by said respective circuits and adapted to operate on the tape at different points in the width thereof.

4. The combination, with automatic weighing apparatus embodying a valve and a shiftable load-discharger, of a pair of electric circuits; a pair of separately-operable electric-circuit controllers governed, respectively, by the valve and the load-discharger and controlling said respective circuits; tape-feeding means; and puncturing recording devices controlled by said respective circuits and alined transversely of the tape, and thereby adapted to operate on the tape at different points in the width thereof.

5. The combination, with automatic weighing apparatus embodying a valve and a shiftable load-discharger, of a pair of electric circuits; a pair of separately-operable automatic electric-circuit controllers governed, respectively, by the valve and the load-discharger and controlling said respective circuits; tape-feeding means; and recording-knives controlled by said respective circuits and having their cutting edges alined transversely of the tape, and thereby adapted to operate on the tape at different points in the width thereof.

6. The combination, with automatic weighing apparatus embodying a valve and a shiftable load-discharger, of a pair of electric circuits; a pair of separately-operable automatic circuit-controllers governed, respectively, by the valve and the load-discharger and controlling said respective circuits; indicating devices controlled by said respective circuits; and a secondary automatic make-and-break controlling one of said circuits.

7. The combination, with automatic weighing apparatus embodying a valve and a shiftable load-discharger, of a pair of electric circuits; a pair of separately-operable electric-circuit controllers governed, respectively, by the valve and the load-discharger and controlling said respective circuits; tape-feeding means; recording devices controlled by said respective circuits; and a secondary automatic make-and-break controlling said circuits.

8. The combination, with weighing apparatus embodying a valve and a shiftable load-discharger; of a pair of electric circuits controlled, respectively, by the valve and the load-discharger; tape-feeding means; and recording devices controlled by said respective circuits.

9. The combination, with weighing apparatus embodying a valve, beam mechanism, and a shiftable load-discharger; of a plurality of electric circuits controlled, respectively, by the valve, the beam mechanism and the load-discharger; tape-feeding means; and recording devices controlled by said respective circuits.

10. The combination, with automatic weighing apparatus embodying a valve, beam mechanism, and a shiftable load-discharger, of a plurality of electric circuits; a plurality of separately-operable automatic electric-circuit controllers governed, respectively, by the valve, the beam mechanism, and the load-discharger; and registering devices controlled by said respective circuits.

11. The combination, with a pair of electric circuits, of a stream-controller having circuit-controlling means for closing said circuits alternately; and an electromagnetically-operated indicator having a normal idle position and also having two indicating positions controlled by said circuits.

12. The combination, with a stream-controller, of driving means therefor; an electrically-operated reversing device; and automatic circuit-controlling means carried by the stream-controller and controlling the operation of the reversing device.

13. The combination, with a stream-controller, of driving means therefor; a pair of electric circuits; a reversing device controlled by said circuits; and automatic circuit-controlling means carried by the stream-controller and controlling the operation of the reversing device.

14. The combination, with a supply-chute and with a reciprocatory stream-controller therein, of driving means for said stream-controller; a pair of electric circuits; a reversing device controlled by such circuits; and automatic circuit-controlling means carried by the stream-controller and movable between two extreme positions and controlling the operation of the reversing device.

15. The combination, with an electric circuit, of an electromagnetically-controlled reactive circuit-closer in said circuit; a stream-controller; driving means therefor; and an automatic circuit-breaker carried by the stream-controller and operative at a determined point in the movement thereof.

16. The combination, with a pair of electric circuits, of a reactive circuit-closer for closing said circuits alternately; a pair of electromagnets in said circuits, respectively, for holding the circuit-closer in either of its circuit-closing positions; a stream-controller; driving means therefor; and automatic circuit-breaking means carried by the stream-controller and controlling said circuits and operative at determined points in the movement of the stream-controller.

17. The combination, with a pair of electric circuits, of a reactive circuit-closer for closing said circuits alternately; a pair of electromagnets in said circuits, respectively, for holding the circuit-closer in either of its circuit-closing positions; a reciprocatory stream-controller; driving means for actuating the stream-controller in opposite directions alternately; and automatic circuit-breaking means carried by the stream-controller and operative for breaking said circuits, respectively, on the opening and the closing of the stream-controller.

18. The combination, with an electric circuit, of rotary driving means; a rotary driven member; an electromagnetically-operated coupling member controlled by said circuit; a stream-controller operatively connected with the driven member; and an automatic circuit-breaker carried by the stream-controller and operative at a determined point in the movement thereof.

19. The combination, with an automatic weighing apparatus, of a signal-circuit therefor; a power-circuit; a relay in said signal-circuit and controlling the power-circuit; and circuit-controlling means for the signal-circuit.

20. The combination, with weighing apparatus, of a signal-circuit therefor; a power-circuit; a relay in said signal-circuit and controlling the power-circuit; and automatic circuit-controlling means for the signal-circuit and controlled from the weighing apparatus.

21. The combination, with weighing apparatus, of a signal-circuit therefor; a power-circuit; a relay in said signal-circuit and controlling the power-circuit; a stop-register; and an automatic switch in the signal-circuit and controlled by the stop-register.

22. The combination, with an automatic weighing apparatus embodying a supply-valve, of a signal-circuit; a power-circuit; valve-operating means controlled by the power-circuit; a relay in said signal-circuit and controlling the power-circuit; a stop-register; and an automatic switch in the signal-circuit and controlled by the stop-register.

23. The combination, with a driven member, of a signal-circuit; a power-circuit; driving means controlled by the power-circuit; a relay in said signal-circuit and controlling the power-circuit; a stop-register; an automatic switch operative from the stop-register, for closing the signal-circuit; and an automatic switch for breaking said signal-circuit after a determined period of operation of the driving means.

24. The combination, with a driven member, of a pair of signal-circuits; a power-circuit; driving means controlled by the power-circuit; reversing means for the driven member and controlled by the signal-circuits; a relay controlling the power-circuit and controlled by the signal-circuits; a stop-register; a switch operative from the stop-register, for closing the signal-circuits alternately; and an automatic switch for breaking said signal-circuits alternately after determined periods of operation of the driving means.

25. The combination, with tape-feeding means and with a recording device, of automatic weighing apparatus embodying a settable stopping device; automatic electric-circuit controlling means governed by said stopping device; and electrically-operated means governed by the movements of said circuit-controlling means for starting and stopping said tape-feeding means.

26. The combination, with tape-feeding means and with a recording device, of a weighing apparatus embodying a valve and a valve-actuator shiftable from an operative to an inoperative position, and an automatic electric switch carried by the valve-actuator and controlling the starting and the stopping of said tape-feeding means.

27. The combination, with automatic weighing apparatus embodying a shiftable load-discharger, of an electric circuit; an automatic electric-circuit controller governed by the load-discharger and controlling said circuit; and a plurality of devices controlled by said circuit and operative for indicating separately in different ways the movements of said load-discharger.

28. The combination, with automatic weighing apparatus embodying a shiftable load-discharger, of an electric circuit, an automatic electric-circuit controller governed by said load-discharger and controlling said circuit; a plurality of registering and recording devices controlled by said circuit and operative for registering and recording the movements of said load-discharger; and tape-feeding means.

29. The combination, with automatic weighing apparatus embodying a valve and a shiftable load-discharger, of an electric circuit; an automatic electric-circuit controller governed by said load-discharger; a recording device and a numbering device both controlled by said circuit; and tape-feeding means.

30. The combination, with automatic weighing apparatus embodying a valve and a shiftable load-discharger, of an electric circuit; an automatic circuit-controller governed by said load-discharger; a recording device and a numbering device both controlled by said circuit and operative at different intervals; and tape-feeding means.

31. The combination, with automatic weighing apparatus embodying a valve and a shiftable load-discharger, of a pair of electric circuits; automatic electric-circuit controllers governed, respectively, by the valve and the load-discharger and controlling said circuits; indicating devices controlled by said circuits; and an independently-operative secondary automatic electric switch controlling the operation of one of said indicating devices.

32. The combination, with automatic weighing apparatus embodying a valve and a shiftable load-discharger, of a pair of electric circuits; automatic electric-circuit controllers governed, respectively, by the valve and the load-discharger and controlling said circuits; indicating devices in parallel in one of said circuits; and an independently-operative secondary automatic electric switch in one of such parallel branches.

33. The combination, with an automatic weighing mechanism, of tape-feeding means; a recording device; stopping means operative, at the end of a determined period, for stopping the operation of the weighing mechanism; and electrically-operated means controlled by said stopping means, for stopping said tape-feeding means on the stopping of the operation of the weighing mechanism.

34. The combination, with a tape-feeding device and with a recording device, of actuating means for operating the tape-feeding device; a weighing apparatus; and electrically-operated coupling means controlled by the weighing apparatus, for coupling and uncoupling said actuating means and the tape-feeding device.

35. The combination, with automatic weighing apparatus embodying a valve and a shiftable load-discharger, of a pair of recording devices controlled, respectively, by the valve and the load-discharger; tape-feeding means; and independent time-recording means operative independently of the aforesaid recording devices for recording time indications on the tape.

36. The combination, with weighing apparatus embodying a valve and a shiftable load-discharger, of a pair of recording devices controlled, respectively, by the valve and the load-discharger; tape-feeding means; and an independent time-recording wheel operative independently of the aforesaid recording devices for recording time indications on the tape.

37. The combination, with a weighing apparatus, of a tape-feeding device; a recording device controlled by the weighing apparatus; time-recording means for recording time indications on the tape; actuating means for operating the tape-feeding device and the time-recording means; and coupling means controlled by the weighing apparatus, for coupling the feeding device and the time-recording means to, and uncoupling them from, said actuating means.

38. The combination, with automatic weighing apparatus embodying a valve and a shiftable load-discharger, of a pair of electric circuits, automatic electric-circuit controllers governed, respectively, by the valve and the load-discharger and controlling said circuits; electrically-operated recording devices controlled by said circuits; tape-feeding means; and time-recording means for recording time indications on the tape.

39. The combination, with automatic weighing apparatus embodying a valve and a shiftable load-discharger, of a pair of electric circuits; automatic electric-circuit controllers governed, respectively, by the valve and the load-discharger and controlling said circuits; electrically-operated recording devices controlled by said circuits; tape-feeding means; and a puncturing time-recording wheel operative independently of the aforesaid recording devices for recording time indications on the tape.

FRANCIS H. RICHARDS.

Witnesses:
  F. N. Chase,
  Andrew Ferguson.